Dec. 29, 1942. G. L. HELLER 2,306,698

AGGLOMERATING APPARATUS

Original Filed April 5, 1937

INVENTORS
GEORGE L. HELLER
CARL W. SNOW
BY
Lawrence W. Lindberg
ATTORNEY

Patented Dec. 29, 1942

2,306,698

UNITED STATES PATENT OFFICE 2,306,698

AGGLOMERATING APPARATUS

George L. Heller and Carl W. Snow, Pampa, Tex.

Continuation of application Serial No. 135,028, April 5, 1937. This application January 19, 1940, Serial No. 314,576

4 Claims. (Cl. 23—314)

This invention relates to agglomerating apparatus, and more particularly to apparatus adapted for moistening and agglomerating impalpable powders such as clay, zinc oxide, and carbon black, and is a continuation of our application Serial Number 135,028 filed April 5, 1937.

That type of solid substances which may be classified as impalpable powders is extremely difficult to handle because of its light bulk and dusty character. For example carbon black, as originally produced from natural gas, has an apparent density of three to five pounds per cubic foot and an apparent individual particle diameter in the range of .05 to 1 micron. Even these apparent individual particles of carbon black are in reality themselves primary agglomerates of smaller particles which are invisible to the most powerful microscope. It is the small size of these individual particles which impart to the carbon black its colloidal properties of uniform dispersibility when milled with rubber, oils, resins, and the like.

The primary object of the present invention is to provide apparatus adapted for moistening and agglomerating impalpable powders of the type referred to into a granular product which is free flowing, non-dusting, sufficiently strong to withstand handling, and which, in the case of granular carbon black, will retain its original property of uniform dispersibility when milled with rubber, oil or the like.

It has long been known that carbon black can be agglomerated into a non-dusting product of increased apparent density by agitation and wetting with liquids such as water, gasoline or kerosene. The present invention is based upon the discovery that under properly controlled conditions of agitation and conveyance through an atmosphere of finely atomized water or other wetting liquid, carbon black and other impalpable powders can be moistened and agglomerated while held in air suspension into small granular nuclei which can be then built up by mechanical agitation and accretion into a final, non-dusting, granular product which is stronger and denser and more uniformly sized than similar agglomerated powders prepared by other methods and apparatus and/or employing other wetting means.

A feature of the present apparatus is that it is applicable to the agglomeration of many types of impalpable powders, including soft blacks and lamp black, to produce agglomerate granules ranging in size between 40 mesh and 10 mesh at a very rapid rate.

With the above and other features and objects in view, the invention consists in the improved agglomerating apparatus which is hereinafter described and more particularly defined by the accompanying claims.

In the following description, reference will be made to the accompanying drawing in which—

Figure 1:
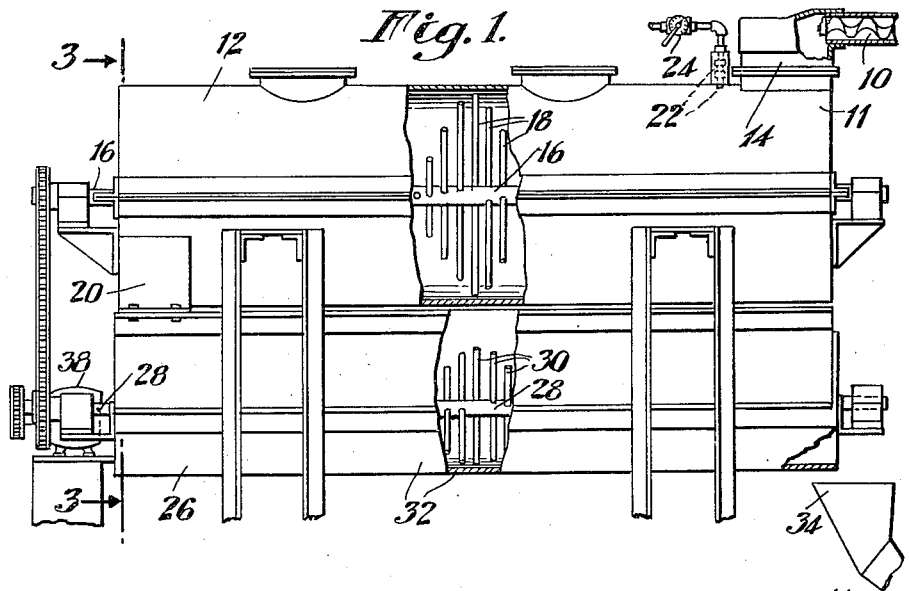
Figure 1 is a view in vertical side elevation, partly broken away, showing a preferred form of the agglomerating apparatus.
Figure 2:
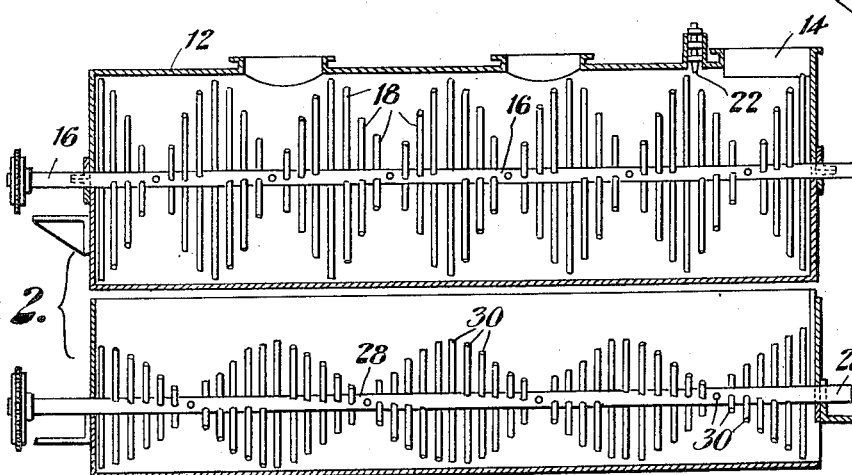
Figure 2 is a view in vertical side section showing in elevation the agitating and conveying elements of the apparatus shown in Figure 1.

Referring to the accompanying drawing, and particularly to Fig. 1, the impalpable powder which is to be moistened and agglomerated is continuously charged at a measured rate from a conveyor 10 into the feed end 11 of a moistening and mixing drum 12 through a charging chute 14. The mixer is a cylindrical drum which experience has shown should have an internal diameter of about 20" and a length about 3 times the internal diameter. Normally the internal capacity of the drum should lie in the range 10–15 cubic feet. The major axis of the mixer is preferably mounted in a horizontal plane. The agitator element within the mixer preferably comprises a rotatable shaft 16 mounted concentrically within the mixer on its major axis, together with rods 18 which are mounted radially on the shaft to extend diametrically of the drum at uniformly spaced distances both longitudinally and angularly throughout the length of the shaft. One such mixer having a 20" internal diameter is fitted with an agitating and conveying element comprising a stainless steel shaft 16 about 3" in diameter on which there is mounted radial rods 18, each ½" in diameter and 14" in length, the longitudinal spacing between rods being 1½" and the angular spacing between adjacent rods being 22½°.

The dry, impalpable powder which is delivered to the feed end 11 of mixer 12 is kept in a state of agitation and air suspension by rotating the shaft 16 at a speed of about 190 R. P. M. Likewise, owing to the angular spacing or pitch of the radial rods along the shaft 16, the powder is continuously moved at a rather rapid pace longitudinally through the mixer in the direction of a discharge chute 20 leading off from the end of the mixer opposite to the feed end. Coincident with the introduction of the impalpable powder into the feed end of the mixer, it is brought into contact while in air suspension with very finely atomized water introduced through atomizing sprays 22 at a rate controlled by means of a metering valve 24 on the water supply line. The quantity of water or other wetting liquid is accurately proportioned to the rate of supply of the dry powder to the mixer, so as to limit the supply of liquid within the proportions which will effect suitable moistening of the powder without formation of any paste or mud. Experience has shown that when agglomerating carbon black, the amount of water added should be limited within the range of from 35% to 65% by weight of the finished aggregate or pellet. Within the above limits the amount of water added varies with the type of powder which is being handled; for example, experience has shown that commercial rubber channel black requires approximately 56% of water by weight of the final wetted product, while a soft black requires only approximately 43% by weight of water. Owing to the speed with which the agitator element of the mixer is rotated and the fine division of the water particles which are introduced into the mixer, it has been found possible to moisten the carbon black while held in finely divided air suspension and to thereby agglomerate the moistened particles of the black into small nuclei during the period in which the black is being conveyed through the mixer for a period of only about 3 to 5 minutes under normal operating conditions.

From the discharge end of mixer 12 the moist nuclei granules are delivered to the feed end of a second agitator 26 which is of about the same length as the mixer 12, but has only about ½ the diameter of the mixer. This second agitator is also preferably mounted with its major axis horizontal, or substantially so, and within this second agitator there is disposed concentrically thereof an axial shaft 28 on which are mounted agitating rods 30 extending diametrically of the agitator with uniform longitudinal and radial spacing; the shaft in the second agitator being rotated at only about ½ the speed at which the shaft 16 in the mixer 12 is rotated. A satisfactory assembly for the second agitator 26 has proven to be a trough 27 having a semi-cylindrical bottom 32 of 6" radius within which is mounted an agitator comprising a 1½" axial shaft 28 on which there is mounted a plurality of agitating rods 30, ½" in diameter and 11¾" long, which are spaced 1½" longitudinally and 15° radially throughout the length of the shaft. Owing to the low speed (about 90 R. P. M.) at which the agitator shaft 28 is rotated, the small moist nuclei granules which are charged to the feed end of trough 26 from the mixer 12 are held only in a state of semi-suspension within the agitator 26 and are thereby roller and built up gradually into agglomerates in the form of fairly uniformly sized dense grains of rounded contour and uniformly porous but relatively strong texture. These finished grains are composed of a large number of the aforementioned nuclei and possess no particularly uniform surface contour, although they are essentially spherical by reason of the prolonged rolling and agitation which they receive while being conveyed through the member 26.

Figures 3, 4:
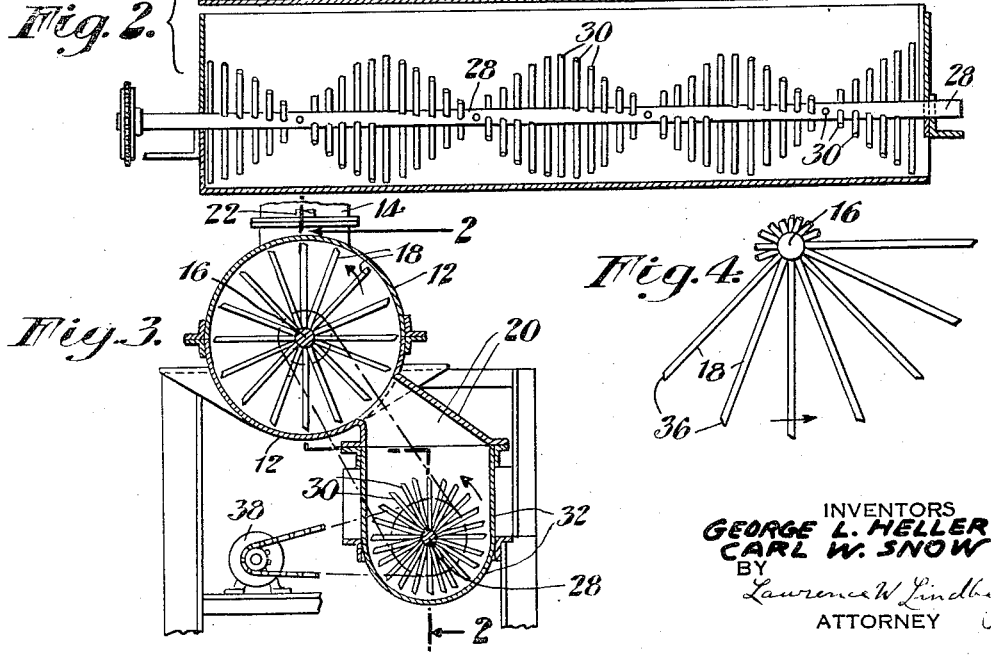
Figure 3 is a view in vertical and section taken on the line 3—3 of Figure 1, taken on the line 2—2 of Fig. 3.
Figure 4 is an enlarged end elevation of a portion of one of the agitating elements.

The dimensions of the mixer and agitator and the dimensions and spacing of the rods 18 and 30 as herein given are regarded as important factors in producing a desirable agglomerated carbon black. Tests on apparatus embodying mixer units of larger dimensions and mixers of greater capacity have given unsatisfactory results. For example, tests made on mixing apparatus of about ⅓ greater diameter and 3 times the length processing the same black with the same amount of wetting have produced a dry agglomerate product which is of low density, very fragile, and more than 50% of which will pass through a 40 mesh screen. Moreover, such apparatus has not the strength to operate at the high speeds necessary to keep the powder in suspension during the wetting operation even when using agitator rods having a diameter greater than ½ inch, and when the agitator in the mixer is operated at a low speed below 150 R. P. M. the black becomes too highly wetted and balls up in the wetting zone to plug the machine. The agitating apparatus of the present equipment is particularly designed for light load and high speed operation. The free ends of the rods 18 and 30 are beveled as shown at point 36 (Fig. 4) in order to afford less opportunity for wet powder to build up on the ends of the rods. The bevel is away from the front of the rod when viewed from the direction in which the rod is moving. When properly operated, without overloading, the agitating apparatus can be powered by a very small electric motor 38 through speed reducing gear trains or belts and pulleys.

In the case of carbon black, the agglomerated product is usually conducted from the discharge end of the second agitator by a chute or conveyor 34 into a drier wherein the black granules are subjected to rapid drying by means of a current of high temperature gas or air blown thereover. The dried granular product obtained by treatment of carbon black in this equipment possesses an apparent density in the neighborhood of 25–40 lbs. per cubic foot. Approximately 90% of this granular product will pass through a standard 10 mesh screen. Only about 2% will pass through a 40 mesh screen. Only about ½ of the product which passes through the 10 mesh will pass through a 16 mesh screen.

The foregoing apparatus is efficient and occupies a minimum of space with reference to the volume of material treated. For example, apparatus of the dimensions specified in the foregoing example will process satisfactorily a carbon black having an apparent density of 3 lbs. per cubic foot, at a continuous rate of 1500 lbs. per hour, producing a granular product having a minimum apparent dry density of 25 lbs. per cubic foot. Since the mixer will only accommodate when full about 30–40 pounds of undensed black, it will be evident that the mixer operates best with a charge of powder which is only about ⅓ its maximum charge capacity.

In the mixer 12 the dry powder is moistened with about equal weight of water or other suitable moistening liquid while held in air suspension by the action of the rotating agitator rods. The rods rotate at such a fast rate that they insure multiple contact impacts between the small drops of water and particles of black thereby moistening the particles and compacting and coalescing them, probably with the aid of surface tension and dielectric effects, into very small spherical agglomerate nuclei of such small size as to readily pass a 100 mesh screen. Further agitation, rolling, and compacting of these nuclei during their conveyance through the second agitator 26 builds up the individual nuclei into grains of somewhat rough but porous surface and varying in size between approximately 8 and 40 mesh. When the finished grains after drying are broken and viewed under a microscope they have been found to consist of an irregular pattern of compacted nuclei which is substantially uniform throughout both as to porosity and density.

The invention having been thus described, what is claimed as new is:

1. The method of agglomerating flocculent carbon black which comprises introducing the flocculent carbon black into a confined body of gas, maintaining the carbon black in a state of suspension in said gas, introducing liquid in a highly atomized state into said body of gas and suspended carbon black, and maintaining said carbon black and liquid in suspension in said gas until nodules of carbon black are formed around individual liquid particles.

2. The method of agglomerating flocculent carbon black which comprises introducing the flocculent carbon black into a confined body of gas, maintaining the carbon black in a state of suspension in said gas, introducing liquid in the form of a fog or mist into said body of gas and suspended carbon black, maintaining said carbon black and liquid in suspension in said gas until nodules of carbon black are formed around individual liquid particles, and further agitating said nodules at decreased rate permitting the same to settle from said gas suspension and to agglomerate the nodules into larger aggregates.

3. The process of converting finely-divided and dusty carbon black into a nodulized form which includes suspending the carbon black in a confined gaseous medium, atomizing liquid in the gaseous medium in moistening relation to the carbon black suspended therein, agitating said medium to maintain the state of suspension of the carbon black and liquid in said medium whereby particles of suspended carbon black agglomerate with particles of suspended liquid to form minute nodules, and removing said nodules from the moistening zone while continuing said agitation to build up said nodules.

4. The process of converting finely-divided and dusty carbon black into a nodulized form which includes suspending the carbon black in a confined gaseous medium, atomizing liquid in the gaseous medium in moistening relation to the carbon black suspended therein, agitating said medium to maintain the state of suspension of the carbon black and liquid in said medium whereby particles of suspended carbon black agglomerate with particles of suspended liquid to form minute nodules, removing said nodules from the moistening zone while continuing said agitation to build up said nodules, and thereafter removing said nodules to a zone of lesser agitation to permit said nodules to gradually leave said state of suspension.

GEORGE L. HELLER.
CARL W. SNOW.